(12) United States Patent
Lombardo et al.

(10) Patent No.: US 6,459,188 B1
(45) Date of Patent: Oct. 1, 2002

(54) INTEGRAL BRUSH HOLDER GASKET

(75) Inventors: Frank R. Lombardo, Rochester, NY (US); Christopher Jones, Dayton, OH (US); Robert Burtis, Auburn Hills, MI (US); Kenneth Green, Lunenburg, VA (US); Richard Q. Harding, Atlanta, GA (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/628,911

(22) Filed: Jul. 31, 2000

(51) Int. Cl.7 .......................... H02K 5/00; H02K 13/00
(52) U.S. Cl. .................. 310/239; 310/89; 310/112; 310/75 R
(58) Field of Search ................ 310/75 R, 239, 310/89, 112

(56) References Cited

U.S. PATENT DOCUMENTS

| | | | | |
|---|---|---|---|---|
| 4,398,135 A | * | 8/1983 | Busch et al. ................. 310/71 |
| 4,614,886 A | * | 9/1986 | Schneider et al. ............ 310/83 |
| 4,713,568 A | * | 12/1987 | Adam et al. ................. 370/112 |
| 5,013,952 A | * | 5/1991 | Sekine et al. ............... 310/239 |
| 5,089,735 A | * | 2/1992 | Sawaguchi et al. .......... 310/88 |
| 5,291,088 A | * | 3/1994 | Adam et al. ................. 310/88 |
| 5,440,186 A | * | 8/1995 | Forsell et al. ............... 310/239 |
| 5,668,422 A | * | 9/1997 | Deynet ........................ 310/71 |
| 5,747,903 A | * | 5/1998 | Klingler ................... 310/75 R |

* cited by examiner

Primary Examiner—Burton S. Mullins
(74) Attorney, Agent, or Firm—J. Gordon Lewis

(57) ABSTRACT

A motor housing assembly includes a motor housing mounted to a gear housing and a brush holder assembly where the brush holder assembly is fixed in position by the junction between the motor housing and the gearbox. In one embodiment, a gasket is mechanically attached to the brush holder assembly via detents, and is compressed between the motor housing and gearbox when the two are assembled together.

20 Claims, 5 Drawing Sheets

INTEGRAL BRUSH HOLDER GASKET

FIELD OF THE INVENTION

The present invention relates to a fractional horsepower electric motor assembly, and more specifically to a motor housing that includes a gasket integrally attached to the motor brush holder and motor housing assembly.

BACKGROUND OF THE INVENTION

Fractional horsepower electric motors are used in numerous automotive applications. For example, electric motors are used in automotive seat adjustment mechanisms, sideview mirror adjustment assemblies, and windshield wiper control mechanisms.

In the last several years, significant engineering effort has been expended on reducing the cost, and increasing the reliability of fractional horsepower electric motors used in automotive applications. One way to reduce the cost is to eliminate as many separate components as possible. Further, one way to increase motor reliability is to reduce or eliminate the potential for moisture to enter the motor assembly.

As noted above, consistent, reliable motor performance requires that the motor assembly be isolated within a watertight housing. In a standard motor assembly, a motor, including electrical brushes, a commutator, and magnets, is located in a motor housing. In particular, electrical brushes are mounted in a brush holder assembly that is inserted around the commutator. The commutator and brush holder are then inserted within the motor housing prior to the motor housing being attached to a gear housing that contains at least one gear driven by the motor. The interface between the motor housing and the gearbox housing is a primary entry pathway for moisture.

The junction between the motor housing and the gearbox housing is conventionally leakproofed by compressing a flat gasket or an o-ring between the two housings when they are joined together. Specifically, before attaching the motor housing to the gear housing, a separate gasket or o-ring is placed on a mating surface of, for example, the motor housing. A corresponding opposed mating surface of the gearbox housing is then placed in facing relationship to the motor housing mating surface, thereby compression the gasket or o-ring between the mating surfaces. It is difficult to properly locate the gasket or o-ring so that it provides an optimal seal. Moreover, gaskets have a tendency not to lay flat, but rather to curl, and o-rings tend to twist and/or roll up, resulting in imperfect leakproofing of the junction between the housings.

Moreover, separate gaskets or o-rings impair the production of motor assemblies because they are often attached to the housings by hand. The alignment of a flat gasket around the outer circumference of the housing can be a rate limiting step in an assembly line operation. This is even more true of an o-ring which typically must be aligned within a circumferential groove preformed in one of the mating surfaces.

Consistent, reliable motor performance is further dependent upon proper alignment between the brushes, the commutator, and the magnets in the motor. Conventionally, this is accomplished by locating and fixing the brush holder within the motor housing with fasteners, usually with screws. Attaching the brush holder assembly within the motor housing in this fashion requires additional machining and more precise tolerances to ensure the consistent and accurate positioning and alignment between the brushes, the commutator, and the magnets. Additionally, depending on their positioning, the fasteners may introduce additional moisture-entry pathways into the motor assembly.

Thus, a mechanism is desired that provides proper alignment of all component parts of the motor without the use of separate fasteners, and without adversely impacting the watertight integrity of the motor assembly.

SUMMARY OF INVENTION

Accordingly, the present invention provides a motor housing assembly that includes a motor housing, a brush holder assembly, a gasket, and a gearbox, such that the brush holder assembly may be fixed in position at a junction between the motor housing and the gearbox. In one preferred embodiment, a gasket is mechanically attached to the brush holder assembly via detents, and is compressed between the motor housing and gearbox when the two are assembled together. The location of the gasket ensures alignment between the brush holder assembly and the commutator, and also serves as a watertight seal at the junction between the motor housing and the gear housing. Furthermore, by retaining the gasket directly upon the brush holder assembly, it is possible to preassemble combined brush holder-gasket assemblies, eliminating a rate limiting step from the production line while providing visual quality control assurance that the gasket has been incorporated into the motor assembly during production.

BRIEF DESCRIPTION OF THE DRAWINGS

A number of features and advantages of the present invention will become apparent from the detailed description of the invention that follows and from the accompanying drawings, wherein.

DETAILED DESCRIPTION OF PREFERRED EMBODIMENTS

Figure 1:
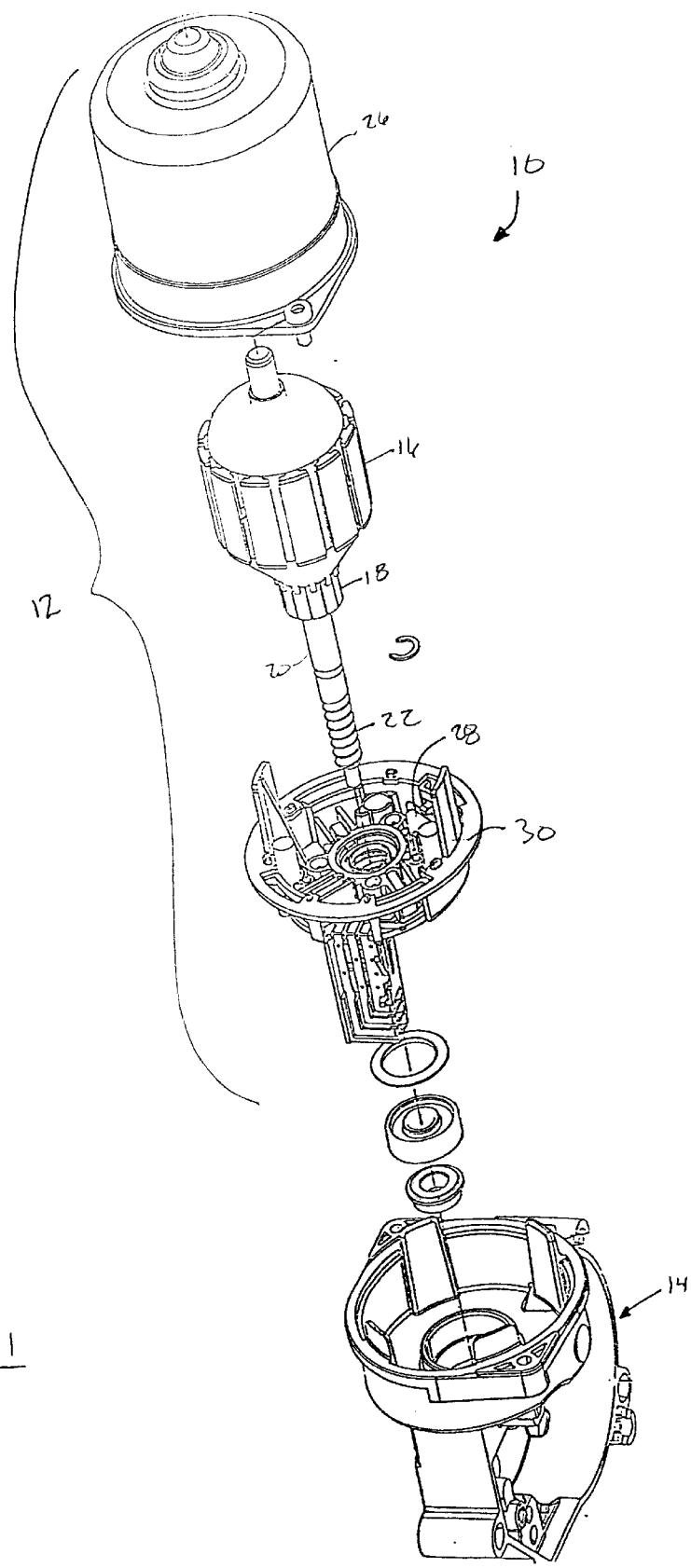
FIG. 1 is an exploded view of a motor housing assembly of the present invention.
Figure 4:
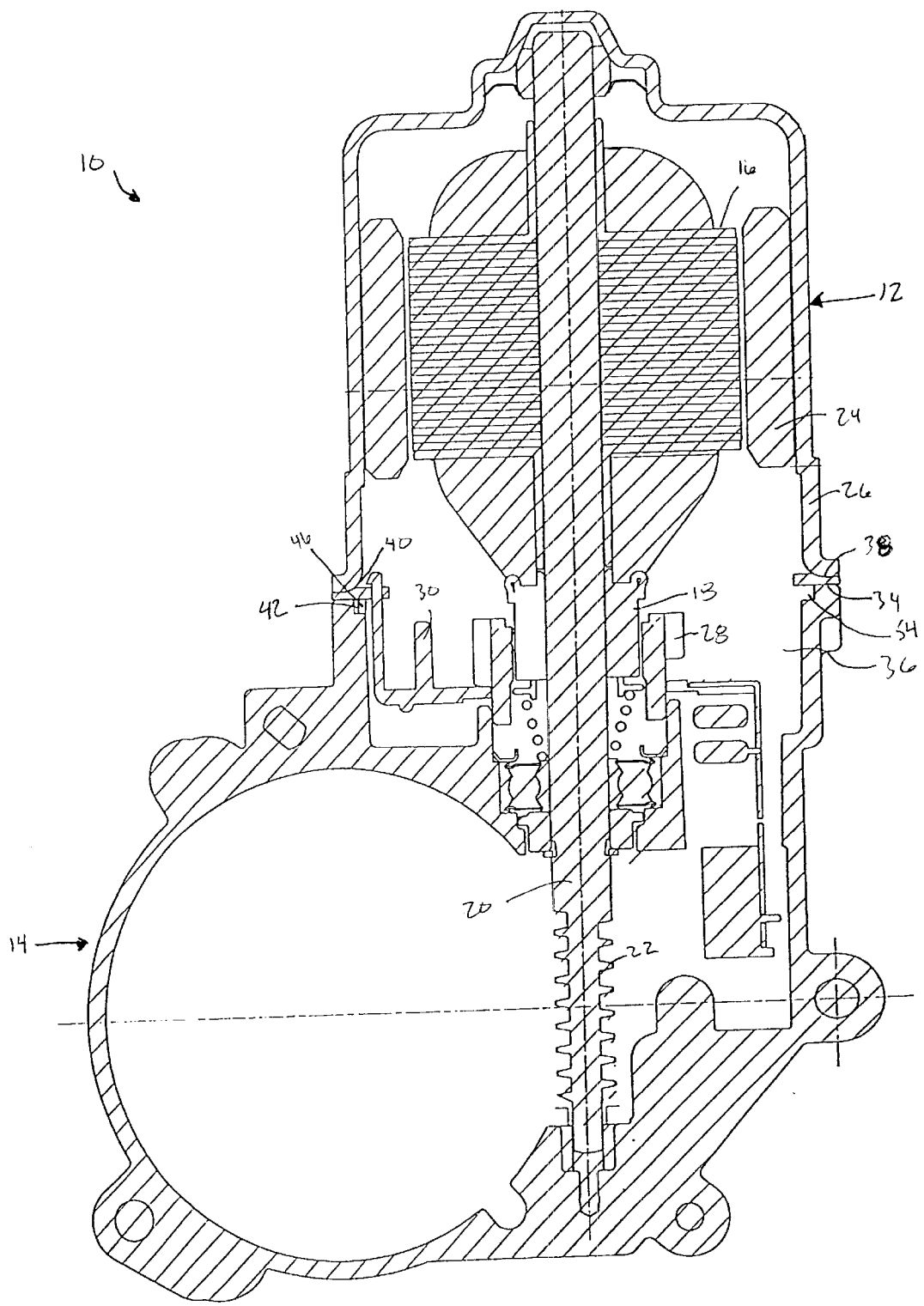
FIG. 4 is a sectional view of a fractional horsepower motor assembly including the present invention.

A fractional horsepower motor assembly 10 is shown in FIGS. 1 and 4, including a motor assembly 12 and a gearbox assembly 14. Motor assembly 12 is a conventional electric motor including an armature portion 16 adjacent a commutator portion 18. Rotation of the armature drives a shaft 20 that terminates in a worm gear 22. When driven by shaft 20, worm gear 22 turns a gear (not shown) located within the gearbox assembly 14 that may be attached to an output shaft (not shown) for driving seat adjustment mechanisms, sideview mirror adjustment mechanisms, windshield wiper control mechanisms, or the like.

Motor assembly further includes at least one field magnet 24 mounted within a motor housing 26 that surrounds armature portion 16 when the motor is fully assembled. Direct current is provided to commutator portion 18 via brushes 28 resiliently mounted within brush holder 30. As is known in the art, brush holder 30 includes a center hole 32 for accommodating the shaft 20 and commutator 18 once the motor is completely assembled. The brushes are disposed around the center hole 32 and are spring-biased so that the brushes normally extend into the center hole 32.

Conventionally, brush holder 30 is affixed within motor housing 26 using fasteners such as screws. However, insertion of a fastener through a portion of brush holder 30 and housing 26 adds an extra manufacturing step and also provides an additional moisture-entry path. To eliminate the need for fasteners, motor assembly 12 is designed such that brush holder 30 aligns near the interface between motor housing 26 and gearbox assembly 14.

Figure 3:
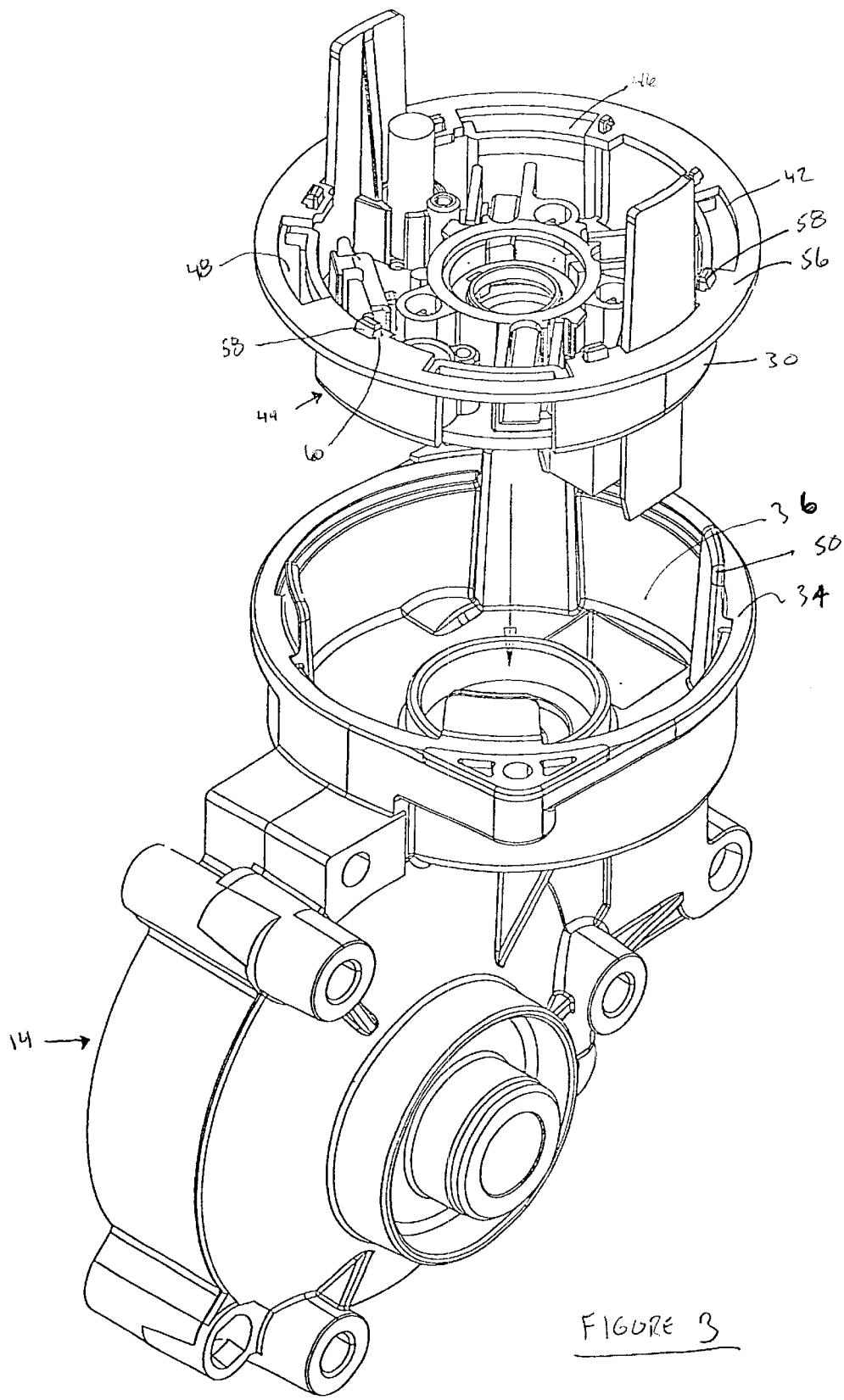
FIG. 3 is a perspective view of gearbox and brush holder assemblies constructed according to the present invention.

As best seen in FIGS. 3 and 4, gearbox assembly 14 includes a mating surface 34 that extends outwardly from the gearbox assembly to define a brush holder cavity 36. Brush holder 30 is sized to be received within cavity 36. During assembly, once brush holder 30 has been placed within cavity 36, a mating surface 38 of motor housing 26 is placed in opposed facing relationship to surface 34, and motor housing 26 is fastened to gearbox assembly 14.

Figure 2:
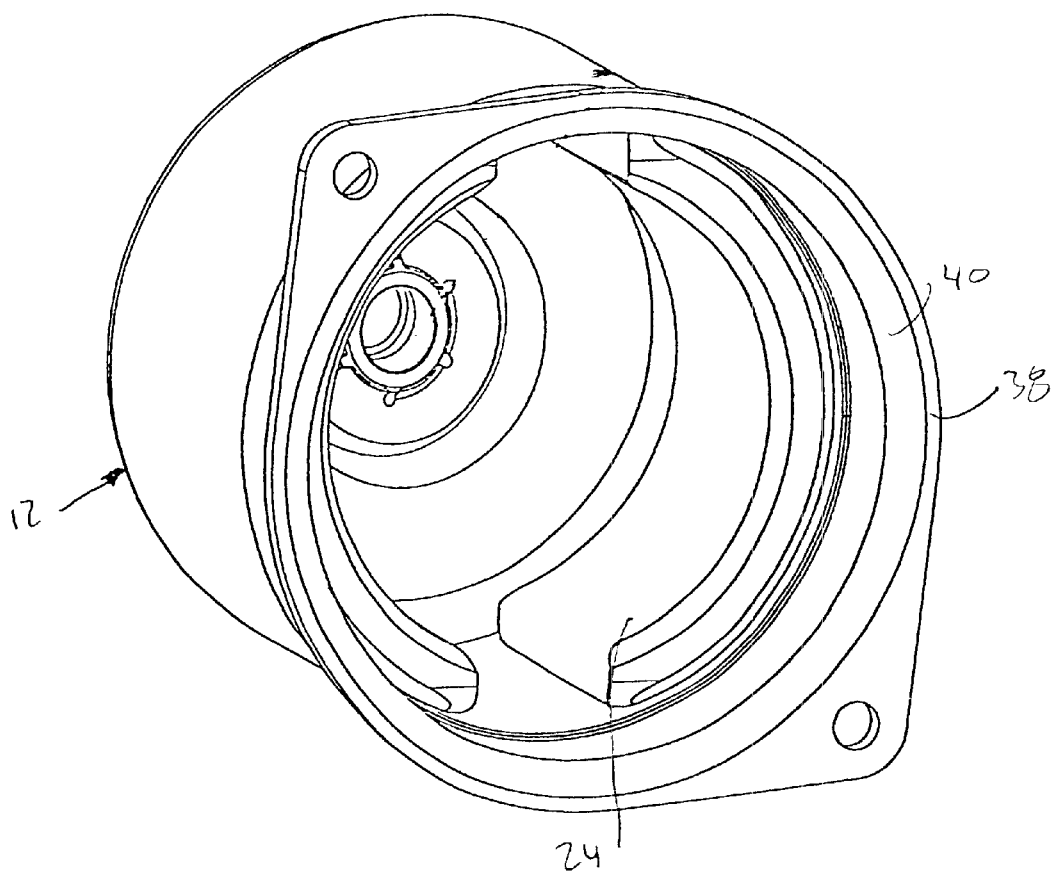
FIG. 2 is a perspective view of the motor housing of the present invention.

Referring to FIGS. 2 and 4, motor housing mating. surface 38 that opposes the gearbox mating surface 34 is an expanding diameter flange 40, wider than the outer perimeter 42 of the brush holder assembly 30 at its widest, and narrower than the brush holder outer perimeter at its narrowest.

Figure 5:
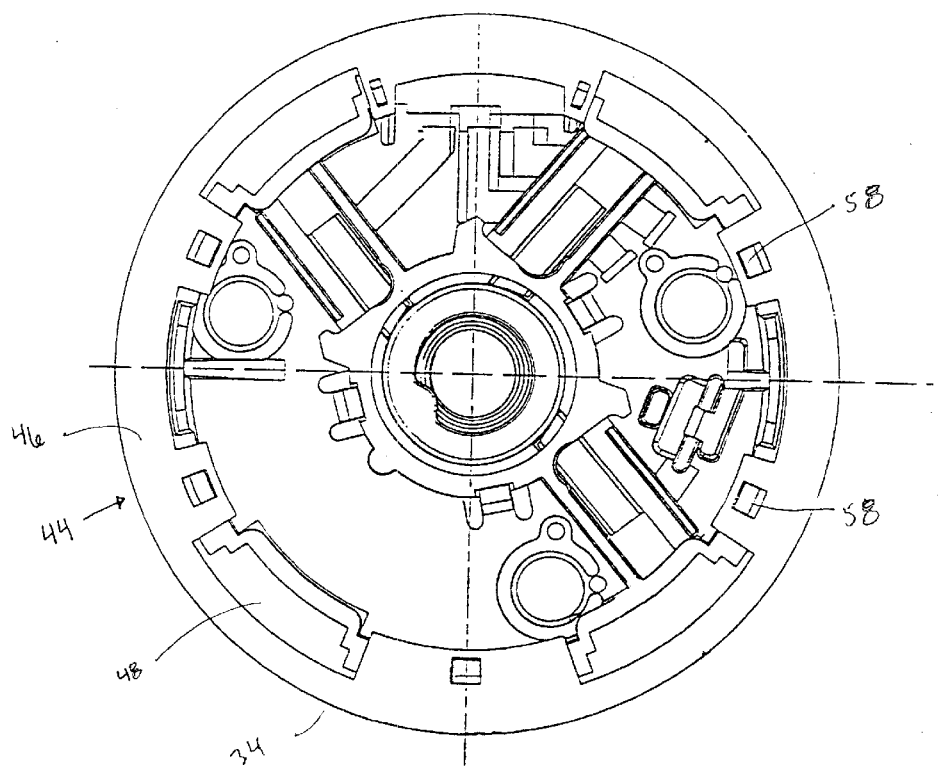
FIG. 5 is a plan view of a gasket and brush holder assembly according to the present invention.
Figure 6:
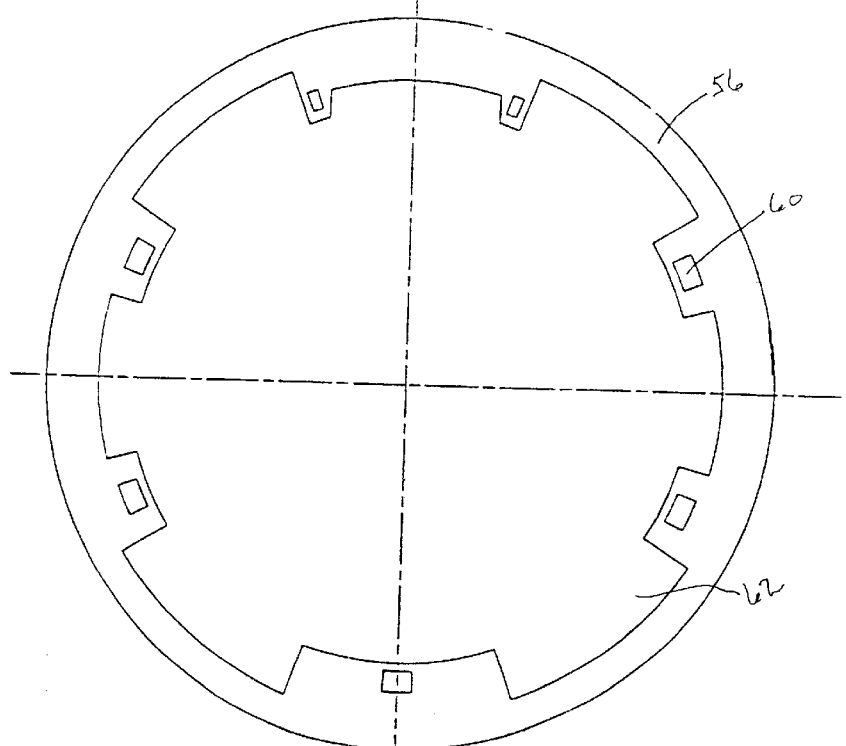
FIG. 6 is a plan view of the gasket of FIG. 5.

As can be seen more clearly in FIG. 5, the brush holder assembly 30 includes a brush housing 44 with a radially protruding collar 46. Collar 46 is not continuous, but intermittent, containing notches 48, through which positioning tenons 50 (FIG. 3) extending from the gearbox brush holder cavity 36 pass when the brush holder 30 is inserted within cavity 36. Combined, the collar 46 and corresponding notches 48 form the outer perimeter 34 of the brush holder assembly 30.

Referring again to FIG. 4, the brush holder 30 is inserted into the motor housing 12 until the inner perimeter of the expanding flange 40 is equal to the outer perimeter 42 of the brush holder 30. At this point, the brush holder assembly 30 will rest on the flange 40 and adjacent gearbox mating surface 34. In a preferred embodiment, the depth to which the brush holder assembly 30 can be inserted into the motor housing 12 is equal to the thickness of the collar 46, such that the collar upper surface 52 is approximately flush with the mating surface 38 of the motor housing 10 when the brush holder assembly 30 is inserted into the motor housing. When mated with the gearbox, the junction of the opposed mating surfaces 34, 38 fixes the brush holder assembly 30 in place, ensuring proper alignment of brushes 28 with commutator portion 18.

The gearbox mating surface 34 further includes a perimeter rabbet 54 that provides space for the collar upper surface 52 to rise above the mating surface 38 of the motor housing 12. Such a construction eliminates the need for any additional form of fastening mechanism to properly align the brush holder assembly 30 in place. Consequently, less machining is required to produce both the motor housing 12 and the brush holder assembly 30. Furthermore, because the brush holder assembly 30 is fixed in position by the junction of the mating surfaces 34, 38 rather than by aligning and affixing fastening means through the motor housing and into the brush holder assembly, the machining tolerances for both the motor housing 12 and the brush holder 30 need not be as precise, allowing faster and less expensive production of the motor assemblies.

However, the interface between opposed mating surfaces 34, 38 remains a primary entry point for moisture, and therefore requires a seal. Conventionally, either of surfaces 34 or 38 includes a machined groove for insertion of a separate o-ring that seals between the surfaces, or else a separate flat gasket is placed between the mating surfaces 34, 38 of the motor housing and the gearbox at the moment they are to be joined. Due to the fact that flat gaskets have a tendency to curl, this step can be cumbersome and rate-limiting during the production process while not adequately preventing moisture entry. The same is true if o-rings are used in place of gaskets, as o-rings have a tendency to twist and/or roll, forming imperfect seals.

In a preferred embodiment, a gasket 56 is mechanically affixed to the brush holder outer perimeter prior to assembly of the motor. As illustrated in FIGS. 3–6, the collar 46 of the brush holder 30 further includes axially protruding gasket detents 58, which are received in corresponding slots 60 formed along at predetermined locations around gasket 56. Detents 58 mechanically retain gasket 56 on the brush holder radial collar 46. Gasket 56 further includes cutouts 62 (FIG. 6) that correspond to the notches 48 in the brush holder collar 46 through which positioning tenons 54 from the gearbox 50 pass during assembly of the motor.

Gasket 56 is preferably formed of a resilient material suitable for compression between opposed flanges 34, 38, and has a thickness sufficient to seal the joint against moisture while also preventing oscillation or vibration of the brush holder 30.

The inclusion of a gasket 56 in the joint between the motor housing 12 and the gearbox assembly 14 further locates the brush holder 30 in relation to the commutator portion 18 while removing the need for a precise fit between the motor housing 10, brush holder 30 and gearbox assembly 14. Additionally, the gasket cooperates with the brush holder collar 46 to force the collar into rabbet 54, thereby fixing the brush holder in place. Similarly, gearbox positioning tenons 50 will pass through the notches 48, 62 in the brush holder 30 and gasket 56, respectively, thereby resulting in a properly aligned motor assembly, and also preventing any rotational movement of the brush holder during motor operation.

Further, retaining the gasket 56 on detents 58 protruding from the collar 46 of the brush holder 30 prevents the gasket from curling, thereby ensuring a properly seated seal between the mating surfaces 34, 38. The detents 58 further allow for the pre-assembly of the brush holder assembly 30. Affixing the gasket 56 directly to detents 58 on the brush holder may be performed pre-production, resulting in a more efficient production line and streamlining eventual motor assembly. Moreover, attachment of the gasket to the brush holder assembly prior to production improves quality control by allowing the production operator to instantly verify the presence of the gasket while production is taking place, ensuring that those units produced consistently meet specifications.

Thus, the present invention uses both the brush holder assembly and the gasket to eliminate the need for additional fastening mechanisms that ensure the alignment of the brushes with the commutator, to ensure that the gasket lays flat and properly seats when the motor housing and gearbox are mated, and to allow for pre-assembly of the brush holder and elimination of a rate-limiting step in the motor assembly production process.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A gear motor assembly comprising:

a gear housing;

a motor housing for mounting to the gear housing, both the motor housing and the gear housing having corresponding opposed mating surfaces;

a motor for insertion into the motor housing, the motor including a brush holder for aligning a plurality of brushes with a commutator portion of the motor, the brush holder including a radially outwardly extending collar, an outer perimeter of the collar being slightly larger than an inner surface perimeter of the mating surface of the motor housing while being slightly smaller than an outer surface perimeter of the mating surface of the motor housing such that a portion of the collar rests on the mating surface of the motor housing when the brush holder is inserted into the motor housing.

2. The gear motor assembly of claim 1 further comprising the collar including axially extending detents for receiving a gasket to be attached to the collar.

3. The gear motor assembly of claim 2 further comprising the gasket mechanically attached to the collar, wherein the gasket is compressed between the opposed mating surfaces when the motor housing is mounted to the gear housing.

4. The gear motor assembly of claim 2, wherein the gasket includes corresponding slots for receiving the detents to mechanically attach the gasket to the collar.

5. The gear motor assembly of claim 2, wherein an outer perimeter of the gasket is larger than an outer perimeter of the collar, such that a portion of the gasket is compressed between the opposed mating surfaces when the motor housing is mounted to the gear housing.

6. The gear motor assembly of claim 2, wherein the gear housing includes positioning tenons axially extending from an inner surface perimeter of the gear housing, the collar and the gasket including cutouts for receiving the tenons when the motor housing is mounted to the gear housing.

7. The gear motor assembly of claim 1, wherein a portion of the mating surface of the motor housing defines a notch of sufficient depth for receiving the radially outwardly extending collar of the brush holder such that a surface of the collar is approximately flush with a remaining portion of the mating surface of the motor housing when the brush holder is inserted into the motor housing.

8. The gear motor assembly of claim 1, wherein a portion of the mating surface of the motor housing defines a notch of sufficient depth for receiving the radially outwardly extending collar of the brush holder such that a surface of the collar is approximately flush with a remaining portion of the mating surface of the motor housing when the brush holder is inserted into the motor housing.

9. In an electric gear motor assembly including a motor housing mounted to a gear housing along opposed mating surfaces, the motor housing containing an armature portion adjacent at least one field magnet, a commutator portion electrically connected to the armature portion and an armature shaft attached to the commutator portion, the motor housing mounted to a gear housing such that the armature shaft engages a gear within the gear housing, a brush holder for aligning at least one brush with the commutator portion, the improvement comprising:

a body sized to fit within the motor housing, the body including a radially outwardly extending collar, an outer perimeter of the collar being slightly larger than an inner surface perimeter of the mating surface of the motor housing while being slightly smaller than an outer surface perimeter of the mating surface of the motor housing such that a portion of the collar rests on the mating surface of the motor housing when the brush holder is inserted into the motor housing.

10. The gear motor assembly of claim 9 further comprising the collar including axially extending detents for receiving a gasket to be attached to the collar.

11. The gear motor assembly of claim 10, further comprising the gasket mechanically attached to the collar, wherein the gasket is compressed between the opposed mating surfaces when the motor housing is mounted to the gear housing.

12. The gear motor assembly of claim 10, wherein the gasket further includes corresponding slots for receiving the detents to mechanically attach the gasket to the collar.

13. The gear motor assembly of claim 10, wherein an outer perimeter of the gasket is larger than an outer perimeter of the collar, such that a portion of the gasket is compressed between the opposed mating surfaces when the motor housing is mounted to the gear housing.

14. The gear motor assembly of claim 10, wherein the gear housing includes positioning tenons axially extending from an inner surface perimeter of the gear housing, the collar and the gasket including cutouts for receiving the tenons when the motor housing is mounted to the gear housing.

15. A gear motor assembly comprising:

a gear housing and a motor housing for mounting thereto, said housings having corresponding opposed mating surfaces;

a motor for insertion into said motor housing, said motor including a brush holder for aligning a plurality of brushes with a commutator portion of said motor;

said brush holder including a radially outwardly extending collar, an outer perimeter of said collar being slightly larger than an inner surface perimeter of said motor housing mating surface such that a portion of said collar rests on said mating surface of said motor housing when said brush holder is inserted into said motor housing, said collar including axially extending detents; and a gasket mechanically attached to said collar, wherein said gasket is compressed between said opposed mating surfaces when said motor housing is mounted to said gear housing, said gasket including corresponding slots for receiving said detents of said collar to mechanically attach said gasket to said collar.

16. The gear motor assembly as in claim 15, wherein an outer perimeter of said gasket is larger than an outer perimeter of said collar, such that a portion of said gasket is compressed between said opposed mating surfaces when said motor housing is mounted to said gear housing.

17. The gear motor assembly as in claim 15, wherein said gear housing includes positioning tenons axially extending from an inner surface perimeter of said gear housing, said collar and said gasket including cutouts for receiving said tenons when said motor housing is mounted to said gear housing.

18. In an electric gear motor assembly including a motor housing mounted to a gear housing along opposed mating surfaces, the motor housing containing an armature portion adjacent at least one field magnet, a commutator portion electrically connected to the armature portion and an armature shaft attached to the commutator portion, the motor housing mounted to a gear housing such that the armature shaft engages a gear within the gear housing, a brush holder for aligning at least one brush with the commutator portion, comprising:

a body sized to fit within the motor housing, said body including a radially outwardly extending collar, an outer perimeter of said collar being slightly larger than an inner surface perimeter of said motor housing mating surface such that a portion of said collar rests on said mating surface of said motor housing when said brush holder is inserted into said motor housing, said collar including axially extending detents; and a gasket mechanically attached to said collar, wherein said gasket is compressed between said opposed mating surfaces when said motor housing is mounted to said gear housing, said gasket including corresponding slots for receiving said detents of said collar to mechanically attach said gasket to said collar.

19. The gear motor assembly as in claim 18, wherein an outer perimeter of said gasket is larger than an outer perimeter of said collar, such that a portion of said gasket is compressed between said opposed mating surfaces when said motor housing is mounted to said gear housing.

20. The gear motor assembly as in claim 19, wherein said gear housing includes positioning tenons axially extending from an inner surface perimeter of said gear housing, said collar and said gasket including cutouts for receiving said tenons when said motor housing is mounted to said gear housing.

* * * * *